US010108916B2

(12) United States Patent
Bhowmik et al.

(10) Patent No.: US 10,108,916 B2
(45) Date of Patent: Oct. 23, 2018

(54) SYSTEMS AND METHODS FOR SUPPLY CHAIN DESIGN AND ANALYSIS

(71) Applicant: TATA CONSULTANCY SERVICES LIMITED, Maharashtra (IN)

(72) Inventors: Amit Bhowmik, Navi Mumbai (IN); Gautam Sardar, Cincinnati, OH (US)

(73) Assignee: TATA CONSULTANCY SERVICES, Mumbai (IN)

( * ) Notice: Subject to any disclaimer, the term of this patent is extended or adjusted under 35 U.S.C. 154(b) by 358 days.

(21) Appl. No.: 13/973,734

(22) Filed: Aug. 22, 2013

(65) Prior Publication Data
US 2015/0051940 A1 Feb. 19, 2015

Related U.S. Application Data

(60) Provisional application No. 61/866,719, filed on Aug. 16, 2013.

(51) Int. Cl.
*G06Q 10/06* (2012.01)
(52) U.S. Cl.
CPC .............................. *G06Q 10/06315* (2013.01)
(58) Field of Classification Search
CPC ....................................................... G06Q 10/06
USPC ......................................................... 705/7.25
See application file for complete search history.

(56) References Cited

U.S. PATENT DOCUMENTS

| | | | | |
|---|---|---|---|---|
| 5,953,707 A * | 9/1999 | Huang et al. ................ 705/7.25 |
| 6,671,673 B1 * | 12/2003 | Baseman et al. ............ 705/7.26 |
| 8,078,485 B1 * | 12/2011 | Kraehmueller et al. ..... 705/7.11 |
| 2003/0018490 A1 * | 1/2003 | Magers et al. ................... 705/1 |
| 2004/0138934 A1 * | 7/2004 | Johnson ................. G06Q 10/06 705/7.36 |
| 2005/0171828 A1 * | 8/2005 | Denton et al. ...................... 705/8 |
| 2006/0190310 A1 * | 8/2006 | Gudla ..................... G06Q 10/04 705/7.11 |
| 2008/0015721 A1 * | 1/2008 | Spearman ....................... 700/99 |
| 2008/0300844 A1 * | 12/2008 | Bagchi ................... G06Q 10/06 703/13 |
| 2014/0032255 A1 * | 1/2014 | Hegazi ......................... 705/7.22 |

* cited by examiner

*Primary Examiner* — Kurtis Gills
(74) *Attorney, Agent, or Firm* — Lee & Hayes, PLLC

(57) ABSTRACT

Systems and methods for supply chain design and analysis to optimize costs associated with a supply chain are described. According to an embodiment, the supply chain management system comprises a data extraction module, an analysis module, and a presentation module coupled to a processor. The data extraction module obtains supply chain data from one or more data sources. The analysis module analyzes a plurality of parameters and at least one future state map to ascertain at least one business scenario. Further, the analysis module identifies flow constraints in the at least one business scenario based on a flow analysis. Further, the analysis module selects decision parameters from amongst the plurality of parameters based on the flow constraints and a simulation feedback. Further, the analysis module simulates at least one experimental design based on the decision parameters. Furthermore, the presentation module generates, a plurality of maps based on visual analytics.

9 Claims, 2 Drawing Sheets

SYSTEMS AND METHODS FOR SUPPLY CHAIN DESIGN AND ANALYSIS

CROSS REFERENCE TO RELATED PATENT APPLICATIONS

This application claims priority to U.S. Provisional Patent Application No. 61/866,719 filed on 16 Aug. 2013, entitled "Systems and Methods for Supply Chain Design and Analysis," which is hereby incorporated by reference in its entirety.

TECHNICAL FIELD

The present subject matter relates, in general, to supply chain and, in particular, to supply chain design and analysis.

BACKGROUND

Supply chains are typically described as a network of people and organizations that interact dynamically to produce and sell a product and/or provide a service. The supply chains worldwide are experiencing tremendous increase in their structural complexity due to the globalization of sourcing, manufacturing, and distribution strategies. Today, retailers, manufacturers, and suppliers operate in a fast changing global environment where quantity of products, pricing, their demand, technical specifications and other supply chain parameters are frequently altered. A supply chain for procurement of goods and services usually involves economies of scale, supply reliability, and efficient sourcing in dynamic environment. A distribution supply chain for fulfillment involves reach of distribution network, availability, rapid response and market pricing. Generally, the analysis of a supply chain is known as supply chain analysis.

The supply chain for any particular company may be primarily an internal supply. However, outsourcing is often used as an alternative to internal supply. Usually, outsourcing is used to reduce costs, control inventories, and respond to rapid demand changes. In current economic conditions outsourcing involves more and more suppliers and thus the supply chains are more complex. Generally, supply chain is affected, for example, by the globalization of businesses, the proliferation of product and service variety, increasing complexity of supply networks, and shortening of product life cycles.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the drawings to reference like features and components.

Figure 1:
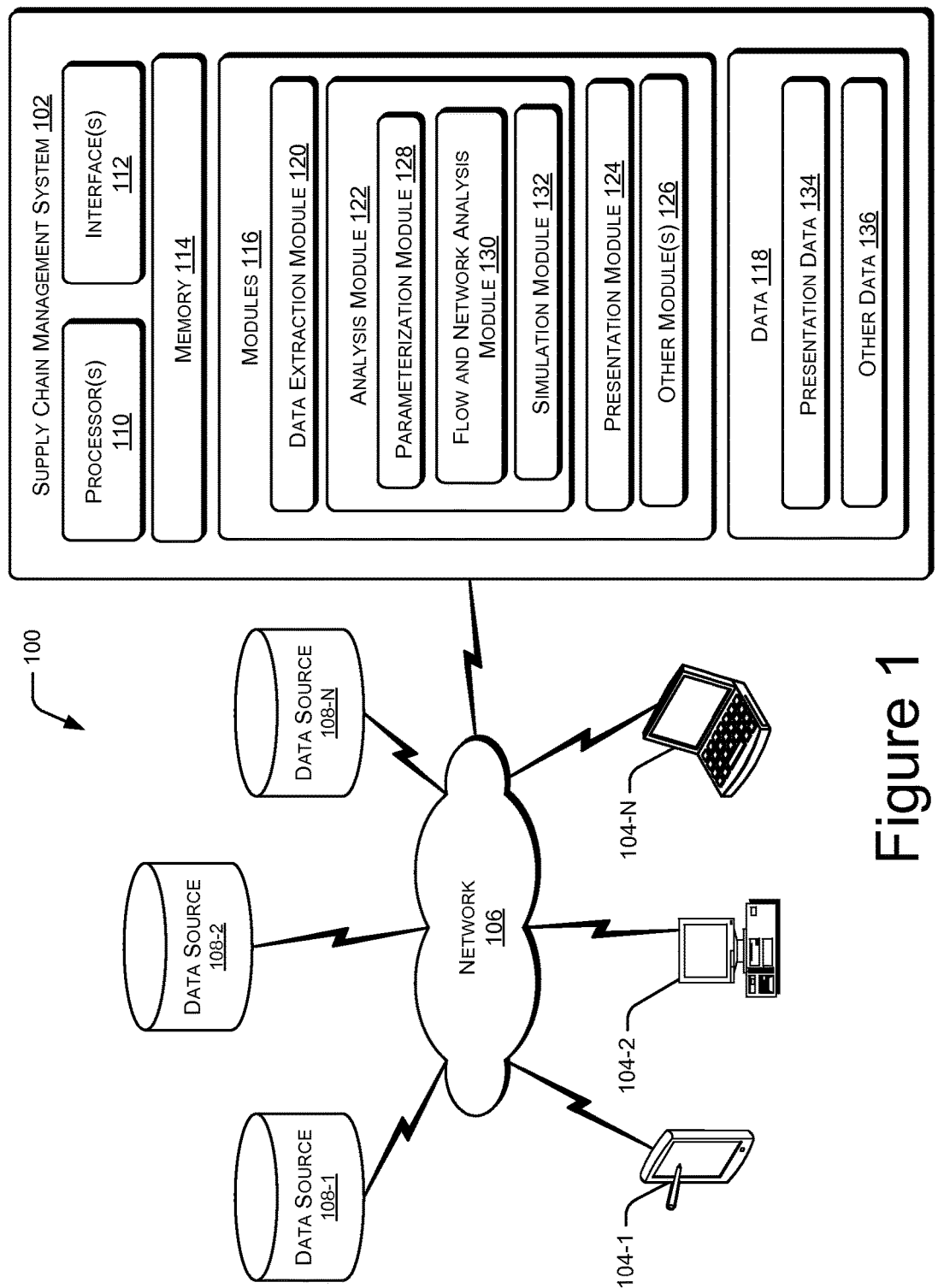
FIG. 1 illustrates a network implementing a supply chain management system, in accordance with an embodiment of the present subject matter.

It should be appreciated by those skilled in the art that any block diagrams herein represents conceptual views of illustrative systems embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Systems and methods for supply chain design and analysis are described herein. The systems and methods may be implemented in a variety of devices. Further, the devices may include, for example, hand-held devices, laptops or other portable computers, such as mobile phones, and the like.

Typically, a supply chain may be described as an integrated process, where a number of varied business entities, such as suppliers, manufacturers, distributors, and retailers, work together in an effort to acquire raw materials, convert the raw materials into specified final products, and deliver the final products to retailers. Generally, supply chains exist in both service and manufacturing organizations, although the complexity of the supply chain may vary greatly based on the type of industry.

In an example, a retailer may offer consumer electronic goods to consumers. To fulfil the requirements of the consumers, the retailer has to manage stock levels in his warehouses. When an item in stock falls below a certain threshold, the retailer may restock the item from a manufacturer. In order to fulfil the retailer's request the manufacturer may have to execute a production run to build the finished goods. The production run may be understood as collective processes that are necessary to manufacture a group of similar or related parts. Further the manufacturer may have to order components from its suppliers. Thus, the supply chain is generally characterized by a forward flow of materials and a backward flow of information.

Current supply chains are full of uncertainty. Increasing competition coupled with changing customer demand has added to volatility of supply and distribution in a supply chain. Globalization and shortening of product life cycle has led to increased complexity of the supply chain. The volatile economic environment and customer demand variability need supply chains to be able to anticipate, control, and react to disruptions and volatility, in collaboration with customers, suppliers and logistics partners. In order to restore supply chain stability, organizations need ways to optimize their global supply chain operations to execute a customer value strategy, which involves selling and fulfilling appropriate products and services, at the right price, place and time.

Supply chain management systems can be generally used to design and analyze the supply chain for the active management of the supply chain to maximize customer value and achieve a sustainable competitive advantage. Further, supply chain design and analysis involves decision making in respect of the movement of raw materials into an organization, manufacturing of raw materials into finished goods, and the movement of finished goods out of the organization and towards the end-consumer. The decision making in supply chain design and analysis may be classified in two broad types, strategic decision making and operational decision making. A strategic decision involves long term decisions, for example, number, location, and size of warehouses, distribution centres, and manufacturing sites. Strategic decisions are closely linked to the corporate strategy, and guide supply chain policies from a design perspective. An operational decision involves short term decisions, for example, daily production and distribution.

Generally, there are five major decision areas based on supply chain analysis: location, production, inventory, transportation and distribution, and there are both strategic and operational decisions in each of these decision areas. Further, substantial supply chain analysis is involved before any type of decision is made. Typically, conventional supply chain design and analysis tools, also referred to as supply chain tools, are utilized by organization for supply chain design and analysis, and subsequent decision making.

Conventional supply chain design and analysis tools are based on various operation research techniques. These conventional tools are complex and, for the users of such conventional tools, a prior knowledge of complex algorithms and expertise in data driven analytics is necessitated for designing and planning the supply chain. Thus, most users are unable to use these conventional tools effectively due to high level of complexity.

Moreover, conventional supply chain tools are built to provide a solution based on historical data. Thus, the conventional supply chain tools are reactive to historical economic environment and often cannot anticipate futuristic economic environment. In addition, the conventional supply chain tools are usually unable to account for the complex and rapidly changing business environment due to lack of sufficient historical data. Further, conventional supply chain tools have a limited ability to be customized, thus resulting in limitation of applicability. Thus, conventional supply chain tools are unable to address challenges arising due to volatility, uncertainty, complexity, and ambiguity in a coordinated fashion. Typically, conventional supply chain design and analysis tools are slow, resulting in loss of valuable time during planning and decision making.

According to the present subject matter, systems and methods for supply chain design and analysis are described herein.

In one implementation of the present subject matter, supply chain data may be obtained from one or more data sources. The supply chain data may include supplier data and bill of material, warehouse and transport data, demand data, and production and site specific data. Further, scenario data is obtained based on user inputs about process involved in a supply chain. Examples of the scenario data may include cost details, material flow patterns and restrictions, process flows, and site constraints.

Thereafter, value stream maps of the supply chain data and the scenario data are obtained to determine a plurality of parameters and future state maps. The plurality of parameters may be understood as factors that may have influence on decisions related to the supply chain. Value stream mapping may be understood as a lean manufacturing technique used to analyze and design the flow of materials and information needed to bring a product or service to a consumer. Further, based on the future state maps and the plurality of parameters, at least one business scenario is ascertained. The at least one business scenario may indicate, for example, transport to be utilized for reduction in total time, suppliers to be used, and route to be used for transportation of goods. In other words, the at least one business scenario depicts a realization of the supply chain.

Further, a flow analysis is performed on the at least one business scenario to identify flow constraints from the at least one business scenario. In an example, the flow constraints may be a supplier in the supply that takes too long to deliver goods or a regulation that slows speed limit to such an extent that it prevents timely delivery of the goods. Once the flow constraints are identified from the at least one business scenario, decision parameters may be determined from amongst the plurality of parameters based on the flow constraints and a simulation feedback. In an example, the simulation feedback may be obtained from previous simulations of business scenarios. The decision parameters may be understood as parameters which are to be considered for simulation purpose and can not be ignored during the simulation. By identifying decision parameters from the plurality of parameters it is ensured that the resulting supply chain design is optimal for at least the decision parameters. It also helps in making the supply chain analysis and design faster and more efficient, as will be explained further.

Subsequently, at least one experimental design is generated based on the at least one business scenario. The at least one experimental design may also be referred to as design of experiments. Thereafter, the at least one experimental design is simulated based on the decision parameters to optimize costs associated with the supply chain. The costs may include operating expenses, capital expenditure, and working capital. Further, speed of design of experiments and simulations thereof is increased since it is performed on a parameterized scenario and focused on the decision parameters. Furthermore, the costs may be optimized by using a cost model. In an example, the cost models may be defined based on inputs received from a decision maker of an organization. Thus the supply chain analysis and design systems and methods of the present subject matter optimize the supply chain design based on cost-to-serve, identify optimal supply and distribution network to fulfil market requirements, and optimize inventory based on demand from customer. The design of experiments and simulations further help to tune the supply chain design and analysis to variable and uncertain market and economic conditions.

Thereafter, a plurality of maps are generated, based on visual analytics, to depict a network flow, a process flow, the decision parameters, and costs associated with the supply chain. Visual analytics uses interactive visual interfaces to depict the supply chain and develop analytical reasoning based on the visual depictions. With the help of the plurality of maps, the decision maker can easily analyze and make changes in the supply chain design to take any tactical and strategic decision. Further, a regression analysis may be performed on results obtained after simulation to determine a regression model based on correlations between the plurality of parameters including decision parameters and the cost model, so that the simulations need not be run multiple times, making it even faster and more efficient. A user may simply change the plurality of parameters to obtain results related to the supply chain. Thus, the system and method for supply chain design and analysis, according to the present subject matter, enables effective supply chain design and analysis and decision making.

Further, according to the present subject matter, the system and the method for supply chain design and analysis utilizes an analytical visualization approach for providing the supply chain design and analysis results. The analytical visualization approach does not necessitate any prior knowledge of complex algorithm by the user. Rather it provides an intuitive presentation interface supported by menu driven visualization components that translate analytical findings into actionable reports and recommendations. It also allows the user to drill down from a strategic planning level to a tactical planning level and to visualize the impact of one type of decision on the other.

The system according to the present subject matter is easy for non designers and planners to use and understand, thus decreasing the overall time taken for decision making. Parameterization approach identifies the decision parameters that enable faster execution of experimental designs. The system further allows the user to customize the supply chain facilities to maintain business alignment in turbulent global scenario. In addition, futurist, optimal and current supply chains may be compared for dynamic and uncertain environmental conditions, for efficient decision making. Moreover, the system and the method based on simplified process of visual scope identification, statistics driven decision parameters identification, experimental designs for scenario runs, simulation modelling, cost modelling, optimization and analytics, is robust and can be implemented in any type of industry. Further, these and other advantages of the present subject matter would be more evident, to a person skilled in the art, in the following detailed description, described in conjunction with the figures.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope.

Figure 2:
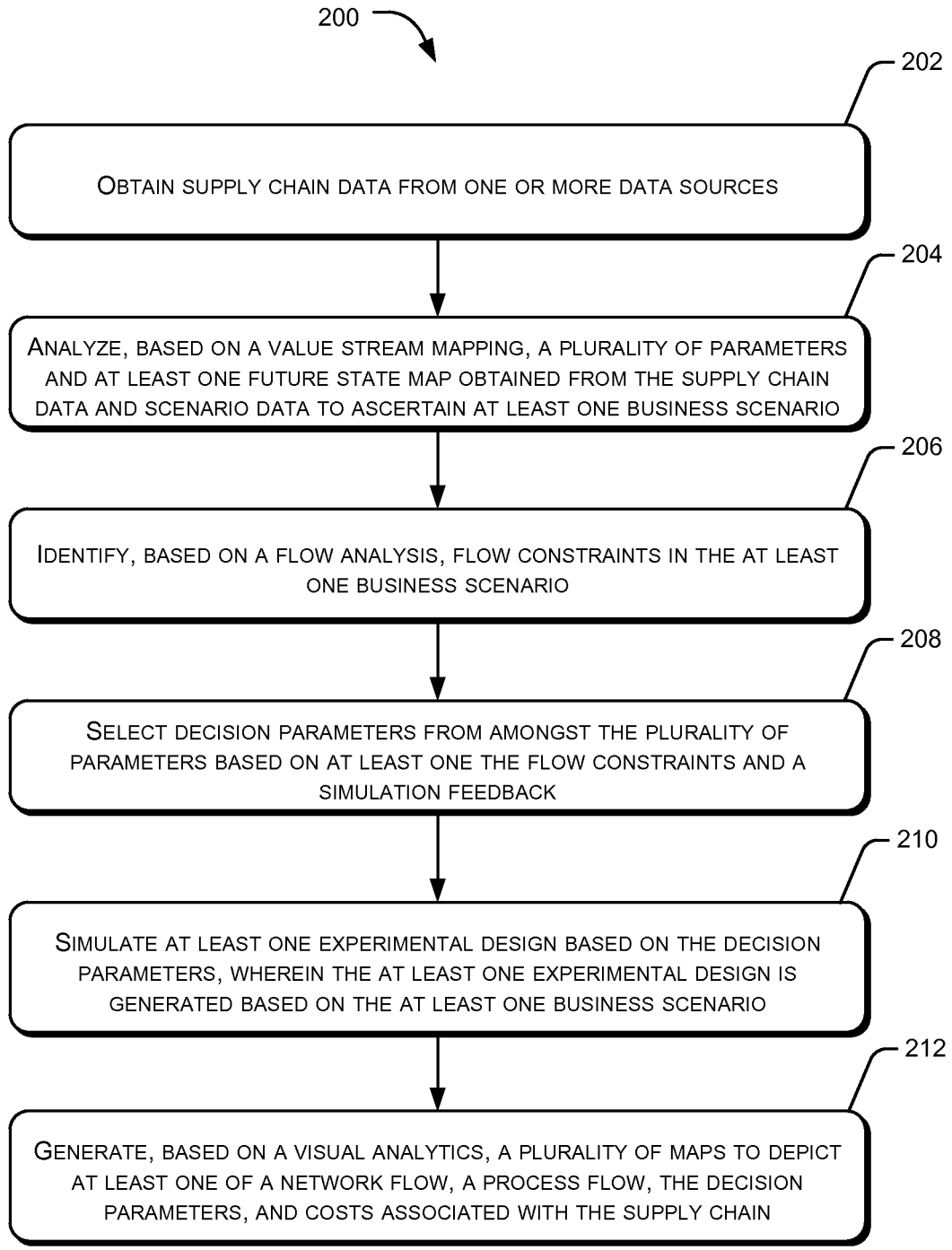
FIG. 2 illustrates a method for supply chain design and analysis, in accordance with an embodiment of the present subject matter.

The manner in which the systems and methods of supply chain design and analysis has been explained in details with respect to the FIGS. 1 and 2. While aspects of described systems and methods supply chain design and analysis can be implemented in any number of different systems, environments, and/or configurations, the embodiments are described in the context of the following exemplary system (s).

FIG. 1 illustrates a network implementing a supply chain management system 102, in accordance with an embodiment of the present subject matter. The supply chain management system 102 designs and analyzes supply chains to enable effective decision making and optimizes costs associated with the supply chains. The supply chain management system 102, henceforth referred to as system 102, may be implemented as a variety of computing devices, such as a laptop computer, a notebook, a workstation, a mainframe computer, a server and the like. The system 102 described herein, can also be implemented in any network environment comprising a variety of network devices, including routers, bridges, servers, computing devices, storage devices, etc.

In one implementation, the system 102 is connected to one or more devices 104-1, 104-2 . . . 104-N, individually and commonly hereinafter referred to as device(s) 104, through a network 106. The devices 104 may be implemented as, but are not limited to, hand-held devices, laptops or other portable computers, tablet computers, mobile phones, personal digital assistants (PDAs), Smartphone, and the like. Further, the system 102 is also communicatively coupled to the one or more data sources 108-1, 108-2 . . . 108-N, individually and commonly hereinafter referred to as data sources 108, through the network 106. The data sources 108 may have details related to the supply chains, such as supplier data and bill of material, warehouse and transport data, demand data, and production and site specific data. Such data, hereinafter, may be referred to as supply chain data. Further, the data sources 108 may also have scenario data, such as cost constraints, material and process flow patterns, service levels, and site constraints. The data sources 108 may be implemented as, but not limited to, enterprise database, remote database, local database, and the like. The data sources 108 may be located within the vicinity of the system 102 and devices 104 or may be located at different geographic location as compared to that of the system 102 and devices 104. Further, the supply chain data stored in the data sources 108 may be also be present within the device 104 or the system 102.

The network 106 may be a wireless or a wired network, or a combination thereof. The network 106 can be a collection of individual networks, interconnected with each other and functioning as a single large network (e.g., the internet or an intranet). The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

In one implementation, the system 102 includes processor (s) 110. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in a memory.

Also, the system 102 includes interface(s) 112. The interfaces 112 may include a variety of software and hardware interfaces that allow the system 102 to interact with the entities of the network 106, or with each other. The interfaces 112 may facilitate multiple communications within a wide variety of networks and protocol types, including wire networks, for example, LAN, cable, etc., and wireless networks, for example, WLAN, cellular, satellite-based network, etc.

The system 102 may also include a memory 114. The memory 114 may be coupled to the processor 110. The memory 114 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the system 102 may include module(s) 116 and data 118. The modules 116 may be coupled to the processors 112 and amongst other things, include routines, programs, objects, components, data structures, etc., which perform particular tasks or implement particular abstract data types. The modules 116 may also be implemented as, signal processor(s), state machine(s), logic circuitries, and/or any other device or component that manipulate signals based on operational instructions.

Further, the modules 116 can be implemented in hardware, instructions executed by a processing unit, or by a combination thereof. The processing unit can comprise a computer, a processor, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In another aspect of the present subject matter, the modules 116 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In an implementation, the modules 116 include a data extraction module 120, an analysis module 122, a presentation module 124, and other module(s) 126. Further, the analysis module 122 includes a parameterization module 128, a flow and network analysis module 130, and a simulation module 132. The other module(s) 126 may include programs or coded instructions that supplement applications or functions performed by the system 102. Further, the data 118 may include presentation data 134 and other data 136. The other data 136, amongst other things, may serve as a repository for storing data that is processed, received, or generated as a result of the execution of one or more modules in the modules 116. Although the data 118 is shown internal to the system 102, it may be understood that the data 120 can reside in an external repository (not shown in the figure), which may be coupled to system 102.

In one embodiment of the present subject matter, the data extraction module 120 obtains supply chain data from the one or more data sources 108. Further, the data extraction module 120 also obtains the scenario data based on user inputs and from the one or more data sources 108. The scenario data may include cost constraints, material and process flow patterns, service levels, and site constraints.

Further, extraction of the supply chain data and the scenario data has been explain with reference to an example described here. Consider a multinational garment company located in Thailand supplying clothing and other consumer goods ranging from fashion accessories to luggage to retailers in American and European region. In such example for clothing, the garment company may obtain orders from American and European region. For completing these orders, the garment company buys yarn from three Korean suppliers and provides the yarn to two weaving industries in Taiwan where weaving and dyeing is performed and which is further exported to Thailand. Further, the garment company buys zippers manufactured by three zipper manufacturers in China. Finally, the garment company makes garments in Thailand in two factories. Further, this is supplied to the American and European retailers through multiple distribution warehouses located across America and Europe. In the said example, the system 102 may be implemented for supply chain design and analysis.

According to the described example of the garment company, the data extraction module 120 may obtain the supply chain data and the scenario data. In said example, the scenario data may include cost constraint, such as total cost should not exceed 100,000 US dollars. Further, the scenario data may include site constraint, such as one of the manufacturing units in Thailand is currently under maintenance; where as one of the supplier of zipper in china has labour unrest and can provide half of the ordered zippers. Furthermore, the scenario data includes material flow patterns and process flow such as the yarn bought in Korea is shipped to Japan and then to Taiwan. Further, the supply chain data may include supplier data and bill of material, such as production capacity of supplier Korea, and Taiwan. Moreover, the supply chain data may include warehouse data and transportation data, such as duration to reach from one location to other by train, truck, ship and airplane, warehouse capacity. In addition the supply chain data may include demand data and production data, such as capacity of production in the factories in Thailand.

In the described implementation, the analysis module 122 determines a plurality of parameters, which affect the supply chain, and future state maps obtained based on a value stream mapping of the supply chain data and the scenario data. Examples of the plurality of parameters may include parameters related to demand pattern, supply situation, product availability requirement, forced lead-time, business integration, system integration, integration policy, and business activity. A future state map generally identifies enhancements to be made to the current state that may shorten overall lead time and reduce cost associated with the supply chain. Thereafter, the analysis module 122 may analyze the plurality of parameters and the future state maps to ascertain at least one business scenario.

In one implementation, to ascertain the at least one business scenario, the parameterization module 128 may determine a current state of the supply chain based on the supply chain data extracted from the one or more data sources 108. Thereafter, the parameterization module 128 may identify the plurality of parameters by analyzing the current state and the scenario data. Once the plurality of the parameters are obtained, the parameterization module 128 creates the at least one future map of the supply chain by value stream mapping of the plurality of parameters and the current state obtained from the scenario data. Value stream mapping technique may be described a flow charting method that uses symbols, metrics, and arrows to help visualize processes and track performance. The value stream mapping helps determine which steps of a process add value and which do not. Further, the generated current value stream map shows the current steps, delays, and information flows needed to deliver a product to the costumers. Subsequently, the parameterization module 128 may ascertain the at least one business scenario by analyzing the at least one future map and the scenario data.

According to the aforementioned example of the garment company, the analysis module 122 determines the current state based on the supply chain data and the scenario data. The current state may indicate current working of the supply chain. In the described example, the current state for fulfilling an order of 10,000 garments indicate that the garments company buys yarn from the Korean suppliers and transports it to the weaving industry in Taiwan via Japan in 60 days. Simultaneously, the garment company orders for zippers from zipper manufactures in China, which is further delivered to the warehouse in Thailand in 75 days. Further, the weaving industry weaves and dyes the yarn in to cloth and transports it to the warehouse in Thailand in 60 days. Subsequently, the garment manufacturer manufactures the garments and transports it to distribution sites in Europe and America in 60 days, which is further distributed to the retailers in the American and European region in 30 days. Thus, the total time needed for completion of the order is 150 days. Further, the analysis module 122 generates the future state map based on the current state and the supply chain data. Subsequently, the analysis module 122 identifies the at least one business scenario based on the future maps and the scenario data. In the said example, the business scenarios may be type of transport to be utilized for reduction in total time, increasing the number of suppliers of yarn in Korea, increasing the number of weaving industry in Taiwan, transporting the yarn for Korean directly to Taiwan, decreasing the number of zipper manufactures in China.

Further to the described implementation, the analysis module 122 identifies flow constraints present in the at least one business scenario by performing a flow analysis. Upon identifying the flow constraints, the analysis module 122 may select decision parameters from amongst the plurality of parameters based on at least one of the flow constraints and a simulation feedback. The decision parameters may be understood as parameters needed for simulation of the at least one business scenario for optimal supply chain design and analysis. The selection of the decision parameters helps in reducing simulation time of the business scenario. In one implementation, a sub-module of the analysis module, i.e., the flow and network analysis (FNA) module 130 may execute a flow analysis on the at least one business scenario, as is known in the art. Thereafter, the FNA module 130 may identify the flow constraints from the at least one business scenario based on the flow analysis. Further, the FNA module 130 selects the decision parameters from amongst the plurality of parameters based on the flow constraints in the at least one business scenario and the simulation feedback. In an example, the simulation feedback may be obtained from previous simulations of business scenarios and helps in further refining the selection of decision parameters.

Furthermore, the FNA module 130 may execute a network analysis on the at least one business scenario to optimize resources of multiple enterprises present in the supply chain. The network analysis may be described as the method for determining the location of production, stocking, and sourcing facilities, and paths the product(s) take through them. The network analysis comprises techniques for the systematic analysis of ecological flow networks. For example the techniques used in network analysis are an input-output analysis, cycling analysis and the calculation of indices that characterize the entire supply chain.

Furthermore, the analysis module 122 simulates at least one experimental design based on the decision parameters. In one implementation, the at least one experimental design is generated by the analysis module 122 based on the at least one scenario and network analysis. Various combination of business scenarios are identified and some of the business scenario are selected for determining the at least one of the experimental design. The at least one experimental design may also be referred to as design of experiments and may be described as the design of any information-gathering exercises or experiment where variation is present, whether under the full control of the experimenter or not.

In one implementation, the simulation module 132 present within the analysis module 122 may generate the at least one experimental design based on the at least one business scenario and network analysis. Once the at least one experimental design is obtained, the simulation module 132 may simulate the at least one experimental design for the decision parameters selected from amongst the plurality of parameters. In one implementation, the simulation may be a discrete simulation or a continuous simulation depending on the type of industry for which the supply chain design and analysis is conducted. For example, the discrete simulation may be performed for a product company, such as a car manufacturer, and the continuous simulation may be performed for a process industry, such as oil refinery. In one implementation, the simulation module 132 may provide the simulation feedback to the FNA module 130. As described earlier, the FNA module 130 may use the simulation feedback for determining the decision parameters and refining the flow analysis and network analysis.

Further, the simulation module 132 may determine the costs associated with the supply chain based on the simulation. The costs may include operating expenses, capital expenditures, and working capital of the supply chain. Thereafter, the simulation module 132 may optimize the costs associated with the supply chain based on a cost model. In one implementation, the cost model may be defined based on the user inputs received from the user.

Furthermore, the simulation module 132 may perform a regression analysis on results obtained after the simulation so there is no need to run the simulation again and again. The regression analysis may be described a statistical technique for estimating the relationships among variables, for example, the decision parameters, operating expenses, capital expenditures, and working capital. The simulation module 132 may change values of the decision parameters upon receiving the user input from the user. The simulation results obtained by the simulation module 132 may be then provided to a user for further analytics.

In the described implementation, the presentation module 124 is configured to generate, based on a visual analytics, a plurality of maps to depict a network flow, a process flow, the decision parameters, and costs associated with the supply chain. Further, for utilizing the visual analytics approach, the presentation module 124 segments the supply chain in multiple tiers, which is further stored in the presentation data 134. The visual analytics may be described as a hierarchical ordering of nested sets. For example, a square is a subset of quadrilateral which is a subset of polygon which further is a subset of shape. In the example shape is the biggest set which includes all shapes, further polygons include shapes with sides. The quadrilateral includes a shape with four sides, whereas square is a shape with four equal sides. Similarly, complex subject matter can be segmented into multiple layers with increasing levels of details.

In the described example of the garment company, the supply chain is further segmented by the presentations module 124 into multiple tiers based on the supply chain data and the scenario data. In the first tier, a bird's eye view of the complete supply chain is provided to the user which displays three segments, i.e., supplier, manufacturing, and disruption. Further, the user may select one of the three segments to drill down in the respective section, for example, the user may select the distribution in Europe to obtain regional distribution in various nations in Europe, such as Germany, France, and Italy for the European warehouse. The user may further select, individual nation to know the national level distribution, such as distribution in various regions of Germany to the retailers. Thus, based on the modelling approach during optimization and the analytical visualization approach during presentation, effective supply chain design and analysis and decision making is enabled.

FIG. 2 illustrates a method 200 for supply chain design and analysis, in accordance with an embodiment of the present subject matter. The method 200 may be described in the general context of computer executable instructions. Generally, computer executable instructions can include routines, programs, objects, components, data structures, procedures, and modules, functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200, or alternative method. Additionally, individual blocks may be deleted from the method 200 without departing from the spirit and scope of the subject matter described herein. Furthermore, the method 200 can be implemented in any suitable hardware, software, firmware, or combination thereof. In an example, the method 200 may be implemented in a system, such as the system 102.

Referring to method 200, at bock 202, supply chain data is obtained from the one or more data sources. In an implementation, the data extraction module 120 may obtain the supply chain data from the one or more data sources 108. Further, the data extraction module 120 may also obtain scenario data based on user inputs. Examples of the supply chain data may include supplier data and bill of material, warehouse and transport data, demand data, and production and site specific data. Examples of the scenario data may include cost details, material flow patterns and restrictions, process flows, and site constraints.

At block 204, a plurality of parameters and at least one future state map are analyzed to ascertain at least one business scenario. In one implementation, the plurality of parameters and the future state maps are obtained based on the supply chain data and the scenario data. The plurality of parameters may be understood as parameters involved in designing and analysing the supply chain, such as demand pattern supply situation, product availability requirement, forced lead-time, business Integration, system integration, integration policy, and business activity. Further, the at least one future state map depict architecture and details of the supply chain which may be used in future for supply of goods. In one implementation, the analysis module 122 may analyze the plurality of parameters and the at least one future state map to ascertain the at least one business scenario. The business scenario may provide details about various requirements in the supply chain, such as network flow, process flow, site constraints, and mode of transport.

At block 206, flow constraints are identified in the at least one business scenario based on a flow analysis. In one implementation, the analysis module 122 may perform the flow analysis on the at least one business scenario to identify the flow constraints. In an example, the flow constraint may be a supplier in the supply that takes too long to deliver goods. Further, the analysis module 122 also performs a network analysis on the at least one business scenario to optimize resources of multiple enterprises present in the supply chain.

At block 208, decision parameters are selected from amongst the plurality of parameters based on the flow constraints and a simulation feedback. In one implementation, the analysis module 122 may select the decision parameters from amongst the plurality of parameters to make simulation less complex and reduce simulation time. In one implementation, the analysis module 122 may select the decision parameters based on the simulation feedback received after previous simulations.

At block 210, at least one experimental design is simulated based on the decision parameters. The at least one experimental design is generated based on the at least one business scenario. In one implementation, the analysis module 122 may generate the at least one experimental design based on various combination of the at least one business scenario available. The simulation of the experimental design, instead of the at least one business scenario, so that the simulation for designing and analyzing the supply chain is less complex and faster.

At block 212, a plurality of maps is generated based on a visual analytics. The plurality of maps depicts at least one of a network flow, a process flow, the decision parameters, and the costs associated with the supply chain. In one implementation, the presentation module 124 generates the plurality of maps based on the visual analytics. In an example, presentation module 124 may segment the supply chain in to multiple tiers based on the supply chain data and the scenario data. In first tier, a bird's eye view of the complete supply chain may be provided to the user which displays three segments, i.e., supplier, manufacturing, and disruption. Further, the user may select one of the three segments to drill down in the respective section. The user may further select, individual nation to know the national level. Thus, based on the modelling approach during optimization and the analytical visualization approach during presentation, effective supply chain design and analysis and decision making is enabled.

Although implementations for determining consumption of resources have been described in language specific to structural features and/or method, it is to be understood that the appended claims are not necessarily limited to the specific features or method described. Rather, the specific features and method are disclosed as exemplary implementations for determining consumption of resources.

We claim:

1. A system for design and analysis of a supply chain, wherein the system comprises:
  a processor;
  a data extraction module coupled to the processor to obtain supply chain data and scenario data from one or more data sources, wherein the supply chain data is indicative of supplier data and bill of material, warehouse and transport data, demand data, and production and site specific data, and wherein the scenario data is obtained based on user inputs about process involved in a supply chain;
  an analysis module coupled to the processor to,
    obtain value stream maps of the supply chain data and the scenario data, wherein the value stream maps are indicative of a lean manufacturing technique used to analyze and design the flow of materials and information needed to bring a product or service to a consumer;
    determine a plurality of parameters and future state maps based on the value stream maps and ascertain one or more business scenarios based on the plurality of parameters, and the future state maps, wherein the plurality of parameters are indicative of factors that have influence on decisions related to the supply chain, and wherein the business scenarios are indicative of a realization of the supply chain;
    identify, based on a flow analysis, flow constraints in the one or more business scenarios;
    select decision parameters from the plurality of parameters based on the flow constraints and a simulation feedback, wherein the simulation feedback is obtained from previous simulations of a plurality of business scenarios and the simulation feedback is used for refining the selection of the decision parameters and the flow constraints, and wherein the decision parameters are indicative of parameters needed for simulation of the at least one business scenario for optimal supply chain design and analysis; and
    simulate at least one experimental design based on the decision parameters for optimizing cost using a cost model associated with the supply chain, wherein the at least one experimental design is generated based on combinations of the one or more business scenarios and network analysis, wherein the simulation performed on a parameterized scenario and focused on the selected decision parameters enables increased speed of design of experiments and simulations thereof, and the resulting supply chain design is optimal for at least the selected refined decision parameters, wherein the experimental design and simulations enables tuning of the supply chain design and analysis to varying market conditions, wherein the simulation is a discrete simulation or a continuous simulation depending on type of industry for which the design and analysis of supply chain is conducted wherein the cost includes operating expenses, capital expenditures, and working capital of the supply chain; and perform a regression analysis on results obtained after simulating the at least one experimental design to determine a regression model based on correlations between the plurality of parameters including the decision parameters and the cost model wherein the analysis module further comprises a parameterization module to:

determine a current state of the supply chain based on the supply chain data obtained from the one or more data sources, wherein the current state is indicative of current working of the supply chain;

identify the plurality of parameters by analyzing the current state and the scenario data;

create the at least one future state map of the supply chain based on the value stream mapping of the current state and the plurality of parameters; and ascertain the at least one business scenario by analyzing the at least one future state map and the scenario data; and a presentation module coupled to the processor to generate, based on visual analytics, a plurality of maps to depict at least one of a network flow, a process flow, the decision parameters, and costs associated with the supply chain.

2. The system as claimed in claim 1, wherein the scenario data includes cost details, material flow patterns and restrictions, process flows, and site constraints.

3. The system as claimed in claim 1, wherein the analysis module further comprises a flow and network analysis (FNA) module to, execute the flow analysis on the one or more business scenarios; and identify the flow constraints from the one or more business scenarios based on the flow analysis.

4. The system as claimed in claim 3, wherein the flow and network analysis module executes a network analysis on the one or more business scenarios to optimize resources of multiple enterprises present in the supply chain.

5. The system as claimed in claim 1, wherein the simulation module provides the simulation feedback to the flow and network analysis module.

6. The system as claimed in claim 1, wherein the simulation module changes values of the decision parameters upon receiving the user input, and re-determines the cost associated with the supply chain based on the regression model.

7. A method for design and analysis of a supply chain, wherein the method comprises:

obtaining, by the processor, supply chain data and scenario data from one or more data sources, wherein the supply chain data is indicative of supplier data and bill of material, warehouse and transport data, demand data, and production and site specific data, and wherein the scenario data is obtained based on user inputs about process involved in a supply chain;

determining a current state of the supply chain based on the supply chain data obtained from the one or more data sources, wherein the current state is indicative of current working of the supply chain;

obtaining, by the processor, value stream maps of the supply chain data and the scenario data, wherein the value stream maps are indicative of a lean manufacturing technique used to analyze and design the flow of materials and information needed to bring a product or service to a consumer;

determining, by the processor, a plurality of parameters and future state maps based on the value stream maps, and ascertaining one or more business scenarios based on the plurality of parameters and the future state maps, wherein the plurality of parameters are indicative of factors that have influence on decisions related to the supply chain, and wherein the business scenarios are indicative of a realization of the supply chain;

identifying the plurality of parameters by analyzing the current state and the scenario data;

creating the future state maps of the supply chain based on the value stream mapping of the current state and the plurality of parameters;

ascertain the one or more business scenarios by analyzing the at least one future state map and the scenario data;

identifying, by the processor, based on a flow analysis, flow constraints in the one or more business scenarios;

selecting, by the processor, decision parameters from the plurality of parameters based on the flow constraints and a simulation feedback, wherein the simulation feedback is obtained from previous simulations of one or more business scenarios and the simulation feedback is used for refining the selection of the decision parameters and the flow constraints, and wherein the decision parameters are indicative of parameters needed for simulation of the at least one business scenario for optimal supply chain design and analysis;

simulating, by the processor, at least one experimental design based on the decision parameters for optimizing cost using a cost model associated with the supply chain, wherein the at least one experimental design is generated based on combinations of the one or more business scenarios and network analysis, wherein the simulation is performed on parameterized scenario and focused on the selected decision parameters enables increased speed of design of experiments and simulations thereof, and the resulting supply chain design is optimal for at least the selected refined decision parameters, wherein the experimental design and simulations enables tuning the supply chain design and analysis to varying market conditions, wherein the simulation is a discrete simulation or a continuous simulation depending on type of industry for which the design and analysis of supply chain is conducted: wherein the cost includes operating expenses: capital expenditures: and working capital of the supply chain;

performing, by the processor, a regression analysis on results obtained after stimulating the at least one experimental design to determine a regression model based on correlations between the plurality of parameters including the decision parameters and the cost model; and generating, by the processor, based on visual analytics, a plurality of maps to depict at least one of a network flow, a process flow, the decision parameters, and costs associated with the supply chain.

8. The method as claimed in claim 7 wherein the scenario data includes cost details, material flow patterns and restrictions, process flows, and site constraints.

9. The method as claimed in claim 7 further comprises executing a network analysis on the one or more business scenarios to optimize resources of multiple enterprises present in the supply chain.

\* \* \* \* \*